United States Patent [19]

Lazzari

[11] 4,323,940
[45] Apr. 6, 1982

[54] PROCESS, MAGNETIC TRANSDUCER AND SYSTEM FOR GENERATING A MAGNETIC INDUCTION FIELD WITHIN A MAGNETIC MEDIUM

[75] Inventor: Jean P. Lazzari, Montfort l'Amaury, France

[73] Assignee: Compagnie Internationale pour l'Informatique CII-Honeywell Bull (Societe Anonyme), Paris, France

[21] Appl. No.: 104,851

[22] Filed: Dec. 18, 1979

[30] Foreign Application Priority Data

Feb. 27, 1979 [FR] France .................................. 79 05067

[51] Int. Cl.$^3$ .............................................. G11B 5/12
[52] U.S. Cl. ...................................... 360/113; 360/115
[58] Field of Search ................ 360/113, 115, 120–123, 360/125, 55; 324/252; 338/32 R

[56] References Cited

U.S. PATENT DOCUMENTS

| | | | |
|---|---|---|---|
| 3,671,681 | 6/1972 | Stauffer | 360/113 |
| 3,723,665 | 3/1973 | Lazzari et al. | 360/123 |
| 3,846,841 | 11/1974 | Lazzari et al. | 360/121 |
| 4,138,702 | 2/1979 | Magnenet | 360/121 X |

OTHER PUBLICATIONS

IBM/TDB vol. 17, No. 11, Apr. 1975, pp. 3498–3500, "Six Acoustic Transducers . . . " by Bajorek et al.
IBM/TDB vol. 12, No. 8, Jan. 1970, p. 1304, "Magnetic Recording . . . " by Wellbrock.
IBM/TDB vol. 21, No. 2, Jul. 1978, pp. 667–668, "Magnetic Read/Write Thin Film Head . . . " by Brunsch et al.
IEEE proceedings, Sep. 1966, pp. 1216–1217, "A Magnetostrictive Device for Use in Scanning" by Chin.

Primary Examiner—John H. Wolff
Attorney, Agent, or Firm—Kerkam, Stowell, Kondracki & Clarke

[57] ABSTRACT

A process for generating a magnetic induction field within a magnetic medium. A magnetic energizing field and a selection wave are caused to act at the same time at each point on a path of at least one unsaturated portion of the magnetic medium, in such manner as to modify the magnetic properties of the medium at this point and so as to produce therein the said induction field. The process is applicable to devices for generating a magnetic field utilized in magnetic data recording systems.

14 Claims, 24 Drawing Figures

PROCESS, MAGNETIC TRANSDUCER AND SYSTEM FOR GENERATING A MAGNETIC INDUCTION FIELD WITHIN A MAGNETIC MEDIUM

CROSS REFERENCE TO RELATED APPLICATIONS

This application is related to my application Ser. No. 104,859, filed Dec. 18, 1979 entitled Process For Generating A Magnetic Induction Field Within A Magnetic Medium.

BACKGROUND OF THE INVENTION

1. Field of the Invention

The present invention relates to a process for generating a magnetic induction field within a magnetic medium or environment, a magnetic field generating device for application of this process and a magnetic recording system incorporating this device. The invention is more particularly applicable to the recording of data on a magnetic carrier and consists in magnetizing the carrier which is positioned in front of and close to a magnetic field generator device, more commonly referred to as a recording transducer, by means of the magnetic field generating device.

2. Description of the Prior Art

In order to better to understand the object of the invention, a brief review of principles in respect to magnetism may be helpful. To this end, it is known that in order to magnetize a magnetic material or a magnetic medium, the material is first exposed to a positive magnetic field having a strength $H_s$ sufficient for the material to be saturated, that is to say for the magnetic induction in the material to reach a limiting value $B_s$. The magnetic field is then removed. This then leaves in the material a magnetic induction ($+B_r$) differing from zero value which is referred to as the remanent induction, and which is characteristic of the particular magnetic material. The magnetic material is then said to be saturated. In other words, magnetizing a magnetic material amounts to saturating the same magnetically. It will be recalled furthermore that if a negative magnetic field is applied to this material, the magnetic induction in the material is cancelled for a value of H referred to as the coercitive field $H_c$. The graph illustrating the variation of the magnetic induction as a function of the field H is then referred to as the "major hysteresis cycle" of the magnetic material.

If the magnetic material is exposed to a magnetic field whose strength is lower than $H_s$ and if this field is then removed, a magnetic induction having a value smaller than $B_r$ then remains within the material. The magnetic material is then said to be unsaturated. If a negative magnetic field is then applied to the same, the magnetic induction is cancelled for a value of H which will be referred to as $H_{cm}$. The graph illustrating the variation of the induction is then referred to as the "minor hysteresis cycle". It should be evident that, for a given magnetic material, there can be an infinite of minor hysteresis cycles between the major cycle on the one hand, and the limiting minor cycle for which the induction and the magnetic field constantly remain equal to zero. The form of the minor cycles varies from one cycle to another; i.e., the minor cycles are not deduced from each other by similarity.

The totality of the magnetic properties of a given point of a magnetic material, that is the induction value, cycle form, coercivity field value, etc., defines the magnetic state of the material at this point. This state is also referred to as magnetization at this point. As a rule the magnetic state of each of the points of a material or medium is not necessarily identical at a given instant.

A magnetic material or medium in which the induction differs from zero (saturated or not) creates a magnetic leakage or stray field in the immediate vicinity of each of the points of its surface, with respect to which field it is demonstrable that it is a function of the coercivity field at this point, and is always smaller than the latter in practice. A medium whose magnetic state may be modified by applying stresses to the same (traction or compression), is referred to as a magnetostrictive environment. The corresponding physical action is referred to as magnetostriction.

Research regarding the phenomenon of magnetostriction and its applications are described, for example, in the following works or articles, an understanding of which would be helpful to an understanding of the invention.

(a) "Research On A Ferro-acoustic Information Storage System", J. W. GRATIAN, R. W. FREYTAG, NASA REPORT CR 249

(b) "Compositional And Angular Dependence Of The Magnetostriction Of Thin Nichel Films", E. N. MITCHELL, G. I. LYKKEN, G. T. BABCOCK, published in J.A.P. (Journal of Applied Physics) volume 34—No. 4—Part 1—April 1963.

(c) "Wire-type Acoustic Delay Lines For Digital Storage", SCARROT, G. G. NAYLOR, published in PROC, IEEE, Part B, Suppl. 3, vol. 103, April 1956, pages 497 to 508.

(d) SONISCAN—"A New Memory Device", by E. U. COHLER and H. RUBINSTEIN published in IEEE "Transactions on Magnetics" Vol. MAG. 2, No. 3, September 1966, pages 528/529.

Magnetic carriers used for data recording are most frequently either cylindrical drums or rigid or flexible discs, or else tapes. They are generally of two types:

the longitudinal magnetization carriers in which the direction of magnetic induction is parallel to the surface of the carrier; and the perpendicular magnetization carriers in which the direction of magnetic induction is perpendicular to the surface of the carrier.

A longitudinal magnetization carrier is commonly associated with a device for generating a magnetic field, formed by an electromagnet whose air gap is a narrow slot. The length of this slot may range between several microns and several tens of microns. When a current is caused to flow in the winding of the electromagnet, the magnetic field lines which close the magnetic circuit of the electromagnet between it poles, outside the air gap, constitute magnetic leakages close to the same, defining a magnetic leakage field. The magnetic carrier is exposed to this leakage field for the purpose of being magnetized. To record data on a carrier of this kind, the winding may be supplied with a current of variable intensity which creates on the carrier a series of small magnetic areas referred to as "elementary magnets" whose size is of the order of the length of the air gap.

In a more general manner, any surface or volume of a magnetic medium whose dimensions lie between a few microns and several hundreds of microns will be referred to as a magnetic area.

A carrier of the perpendicular magnetization type is commonly associated with a magnetic field generation device of the kind described in the French Pat. No. 2298850 and its corresponding U.S. Pat. No. 4,138,702.

A magnetic recording device of the type described in the aforenoted patent comprises an electromagnet and a magnetic shunt, the magnetic shunt and the electromagnet being positioned at either side of the perpendicular magnetization recording carrier and close to the same, so as to form a closed magnetic circuit in which the magnetic field lines are perpendicular to the surface of the carrier. The magnet comprises a recording pole and a flux closure pole, the crosssection of the recording pole being smaller than that of the flux closure pole. The dimensions of the elementary magnetic areas recorded on the carrier by the magnetic generation devices of this type is of the order of one to a few hundred microns.

It should be apparent that, depending on the kind of carrier and consequently on the kind of magnetic field generation device employed, the dimension of the elementary magnetic areas recorded will be of the order of a few microns to a few hundred microns. When the magnetic carrier is a drum or a tape, the data is recorded on a plurality of adjacent recording lines parallel to the generatrices in the case of a drum and to the width in the case of a tape. The dimension of these lines is of the order of one to several centimeters, or say several tens of centimeters. When the carrier is a disc, the data is recorded on circular concentric tracks having a radial width no greater than a few hundredths of a millimeter and covering the central portion the discs. The radial width of the totality of these tracks is of the order of a few centimeters. In order to record the whole of the data of a recording line of a drum or tape, or for recording data on the radial width of the whole of the tracks of a disc, two solutions are generally employed, notwithstanding the kind of magnetization adopted for these carriers.

The first solution consists in making use of a limited number of recording transducers, most frequently only one, which is displaced along the line which is to be recorded (in the case of a drum or tape) or radially throughout the width of the totality of the tracks (in the case of discs). This requires a controlled system for displacement and positioning of the transducer, which is accurate and costly.

The second solution consists in making use of a sufficient number of recording transducers in such manner that the data are recorded simultaneously throughout the recording line (or throughout the radial width of the totality of the tracks) without having to displace the transducers. This latter approach has several disadvantages. For example, the production cost of an assembly comprising a large number of transducers (several hundred) is high; and the associated electronic control circuits are complex and relatively expensive.

SUMMARY OF THE INVENTION

The present invention renders it possible to eliminate these shortcomings by the use of a single magnetic field generation device or recording transducer which is relatively simple and renders it possible to record the totality of the data of a recording line (or of the width of the whole of the tracks) during a very short time (several tens of microseconds), without the need to displace the same.

In accordance with the invention, such a magnetic field generation device employs a process for the generation of a magnetic induction field within a magnetic medium of which a part is unsaturated. This process is particularly characterized in that it consists in producing in the unsaturated part of the medium, a magnetic energizing field, and a selection wave which is propagated along one given path of this part starting from a given datum point and from a reference instant $t_{Re}$ while modifying, over an area surrounding each point $M_i$ of the said path, the magnetic properties of this area at the instant $t_i$ in which the wave reaches this point. The energizing field and the selection wave act simultaneously at the instant $t_i$ on the said area so as to establish therein the said induction field in this manner. The selection wave may be, for example, a sound wave, thermal wave or light wave.

In a preferred embodiment of the process in accordance with the invention, the magnetic medium is a magnetostrictive medium, and the selection wave produces a mechanical constraint which alters the magnetic properties of any point of the medium which is exposed to the wave.

The magnetic induction field generation device or magnetic recording transducer of the invention is particularly characterized in that it comprises means for generating the selection wave, connected to a given datum point, means for generating the energizing field, at least partially along a given path, and means for eliminating all reflection of the selection wave on the given path.

The recording system for carrying out the process according to the invention and incorporating the magnetic induction field generation device or transducer is characterized in that it comprises means for controlling the means for generating the selection wave, means for controlling the devices for generating the energizing field, and a record carrier situated close to and opposite the magnetic medium in such a manner that the recording is made along a direction parallel to the said path.

BRIEF DESCRIPTION OF THE DRAWINGS

Other features and advantages of the invention will appear from the following description, given by way of non-limiting example and with reference to the accompanying drawings.

In these drawings

FIG. 4 shows a preferred embodiment of the magnetic field generation device or magnetic transducer employing the process in accordance with the invention; and is made up of two illustrations;

FIG. 5 shows, positioned in front of a magnetic recording carrier belonging to the data recording system illustrated in FIG. 3, the magnetostrictive magnetic circuit of the magnetic field generation device shown in FIG. 4; and is made up of two illustrations, FIG. 5a being a pictorial view in perspective.

DESCRIPTION OF THE PREFERRED EMBODIMENTS

Figure 1:
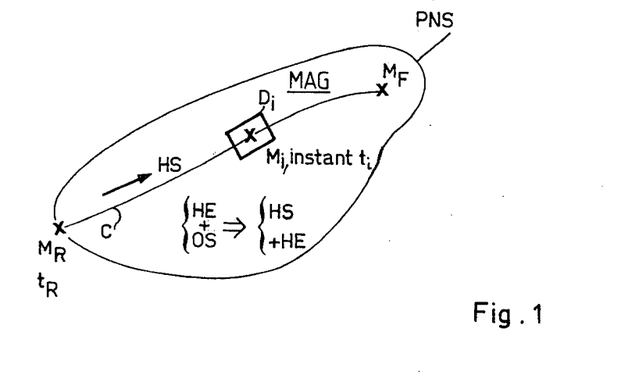
FIGS. 1, 2a and 2b illustrate how a magnetic induction is produced in accordance with the invention in an unsaturated portion of a magnetic medium.

Referring to FIG. 1, which illustrates the principle of the invention, there is shown an unsaturated portion PNS of a magnetic medium MAG of any shape, and a path C situated within or at the surface of the same. To simplify matters let this path C be assumed to be continuous and finite. Its origin, also referred to as the datum point, is the point $M_R$ and its extremity is the point $M_F$.

Figure 2A:
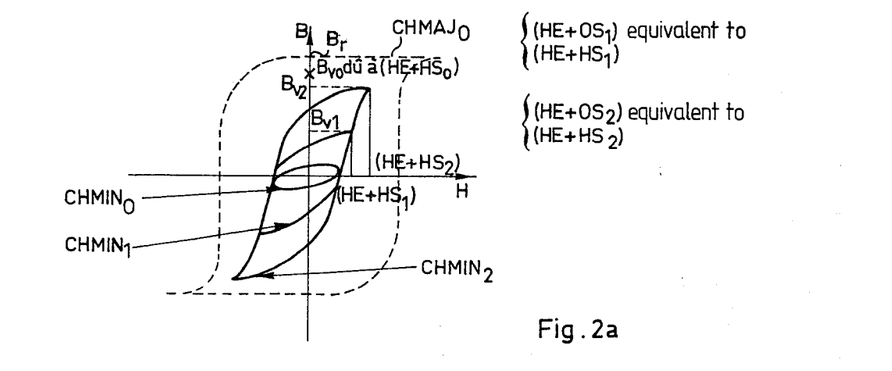

To simplify the analysis, it will be assumed that the initial magnetic state of the totality of the points of the path C is defined by the minor hysteresis cycle $CHMIN_O$ illustrated in FIG. 2a.

In accordance with the invention, a selection wave OS is produced at the time reference instant $t_R$, which is propagated from the datum point $M_R$ along the path C at a propagation speed V. Upon reaching a point $M_i$ of this path at an instant $t_i$, this wave modifies the magnetic properties of an elementary magnetic area $D_i$ surrounding this point. To simplify matters, the elementary area $D_i$ is illustrated as a rectangle in FIG. 1. The result of the action of the wave OS on the area $D_i$ is equivalent to that of the magnetic selection field HS applied at this point.

At the instant $t_i$, a magnetic energizing field HE is applied to the area $D_i$. The action of the field HE on the area $D_i$ combined with that of the wave OS and consequently with that of the magnetic selection field HS renders it possible to obtain the required induction field $B_v$ in the manner shown in FIG. 2a.

Consider now, for example, the effect of a first selection wave $OS_1$ and consequently a first magnetic selection field of strength $HS_1$ whose propagation speed is V. When this first field reaches the point $M_i$, at the instant $t_i$, this point is exposed to the sum of the energizing field HE and of the selection field $HS_1$. The magnetic state of the point $M_i$ is then defined by the minor hysteresis cycle $CHMIN_1$. The magnetic induction field obtained is $B_{v1}$.

Consider now, for example, the effect of a second selection wave $OS_2$ and consequently a second selection field of strength $HS_2$, having the same speed of propagation as that of the wave $OS_1$. When the second field $HS_2$ reaches the point $M_i$ at the instant $t_i$, the elementary magnetic area $D_i$ which surrounds this point is exposed to the sum of the energizing field HE and of the second field $HS_2$. The magnetic state of the area $D_i$ is then defined by the minor cycle $CHMIN_2$ and the magnetic induction field obtained is $B_{v2}$. It will be appreciated that if $\lambda$ is the distance measured along the path C, separating the points $M_R$ and $M_i$, the relationship $\lambda = |V| \times t_i$ exists. The major hysteresis cycle $CHMAJ_O$ of the magnetic environment MAG which defines a remanent induction $B_r$ has equally been illustrated by dashed lines in FIG. 2a. From FIG. 2a, it should be readily apparent that in an unsaturated portion of a magnetic medium, it is possible in accordance with the process of the invention, to generate a magnetic induction field which can have infinite values comprised between O and $B_r$ at any point of an optional path C, at precisely determined instants, due to a selection field HS being propagated at a speed V.

Figure 2B:
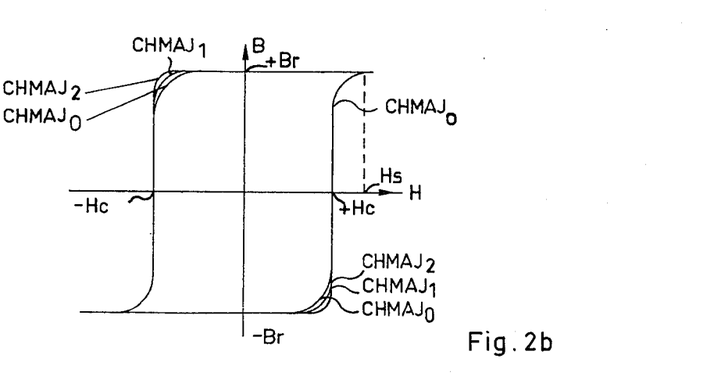

FIG. 2b demonstrates that this result cannot be obtained in a saturated magnetic medium. In fact, if the initial magnetic state (instant $t_R$) of any point $M_i$ of the path C is defined by the major hysteresis cycle $CHMAJ_O$, the circumstance of exposing this point to a magnetic selection field $HS_1$ establishes for the same a new magnetic state corresponding to a major hysteresis cycle $CHMAJ_1$. It is then apparent that this new magnetic state is practically identical to the initial magnetic state of the said point. Similarly, if this point is exposed to the field $HS_2$, its new magnetic state will be defined by the hysteresis cycle $CHMAJ_2$.

In a preferred embodiment of the process in accordance with the invention, the magnetic medium MAG is magnetostrictive and the selection wave OS is a sound wave which is propagated along the path C, while engendering at any point $M_i$ of the same a mechanical stress (traction or compression) whose action on this same point is equivalent to that of the magnetic selection field HS. Thus, if FIG. 2a is referred to, it may be stated that the selection field $HS_1$ is produced by a stress $\sigma_1$, whereas the selection field $HS_2$ is produced by a strain $\sigma_2$ greater than $\sigma_1$. The selection field HS and the energizing field HE are then of the same order of magnitude and it can be shown that the sign of the selection filed HS produced by the stress is identical to that of the energizing field HE. It is apparent that, with a constant energizing field an induction field is obtained whose strength is the greater, the higher the stress. Upon considering FIG. 2b, it is equally apparent that the magnetic induction field remains practically constant notwithstanding the stress applied at any point of the path C. In effect, the circumstance of exposing this point to a stress $\sigma_1$ or to a stress $\sigma_2$ causes it to change from a magnetic state defined by the major cycle $CHMAJ_1$ to a state defined by the major cycle $CHMAJ_2$ which is practically identical to the former.

Figure 3:
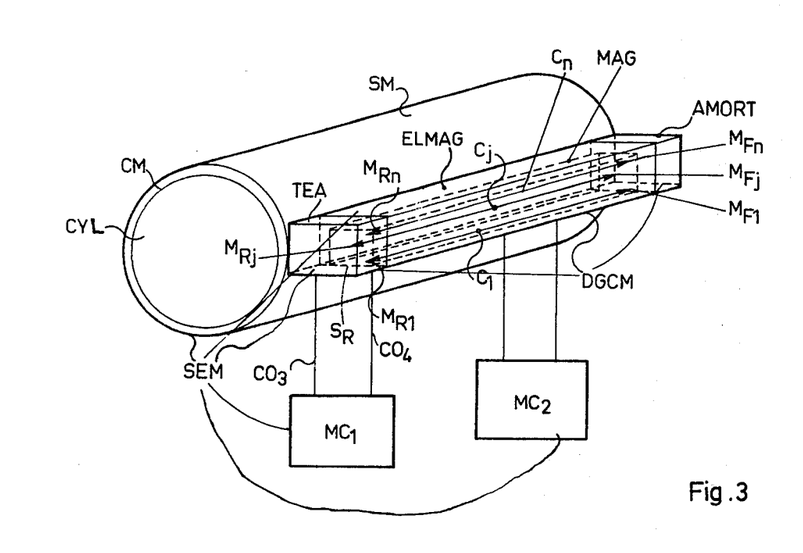
FIG. 3 is a fundamental diagram showing a magnetic data recording system incorporating a device for generating a magnetic field employing the process for generating a magnetic induction field in accordance with the invention.

The system for recording data on a magnetic carrier incorporating a device for generating a magnetic field employing the process in accordance with the invention, illustrated in FIG. 3, and which is denoted by SEM, comprises in particular a magnetic recording carrier SM, a magnetic field generation device or magnetic transducer DGCM incorporating the magnetic medium MAG.

The magnetic recording carrier SM illustrated in FIG. 3 is a drum, but it is obvious that any other kind of recording carrier may be used, for example a magnetic tape. The drum is formed by a solid or hollow cylinder CYL whose surface is covered by a layer of magnetic material CM. This has a relatively high coercitive field comprised between 100 and 500 Oersted. Its hystersis cycle is practically rectangular.

The magnetic field generation device or magnetic transducer DGCM comprises acoustic generating means TEA for generating an acoustic selection wave OS. The acoustic generator is connected mechanically to the magnetostrictive magnetic medium MAG, in such a manner that the stress is propagated in this medium along a direction x'x which is parallel to the generatrices of the drum (also said to be parallel to the width 1 of the drum), the stress $\sigma$ producing in the medium MAG two magnetic selection field HS.

The energizing field is generated by a means ELMAG which incorporates the magnetic medium MAG. This medium comprises a plurality of magnetic paths $C_1, C_2, \ldots, C_j \ldots, C_n$ which are parallel to the generatrices of the drum and situated in its unsaturated portion PNS. The datum points $M_{Rl} \ldots, M_{Rj} \ldots, M_{Rn}$ of each of these paths are connected to the stress generation means TEA, the totality of these points forming a reference surface $S_R$. Damping means AMORT serves to damp out any parasitic reflection of the selection field on the totality of the paths $C_1$ to $C_n$, and is connected to the extreme points $M_{f1}$ to $M_{fn}$ of these paths. The recording system SEM also includes control means $MC_1$ for controlling the generating means TEA for generating the sound wave OS and control means $MC_2$ controlling the energizing field generating means ELMAG for generating the energizing field.

FIGS. 4 and 5 illustrate a preferred embodiment of the magnetic field generation device DGCM for carrying out the process of the invention, and show the sound wave generating means TEA and energizing field generating means ELMAG in greater detail.

Referring to FIG. 4, the sound or stress generation means TEA is formed by an electro-acoustic transducer. This generates a sound wave which is propagated in the magnetic medium MAG. When this wave reaches a point $M_{ij}$ of a path $C_j$, it generates a stress in the medium MAG at this point (traction or compression).

The electro-acoustic transducer TEA is connected to the control means $MC_1$ via electrical conductors $CO_3$ and $CO_4$. The material preferentially used to produce the transducer TEA is lithium niobate whose electro-acoustic efficiency is of the order of 100 times greater than that of other crystals such as quartz (the electro-acoustic efficiency is defined as the ratio between the electrical power supplied to the said transducer and the acoustic power delivered by the said crystal). Its thickness e is of the order of 5 microns and its resonance frequency of the order of 20 megaHertz.

Figure 4A:
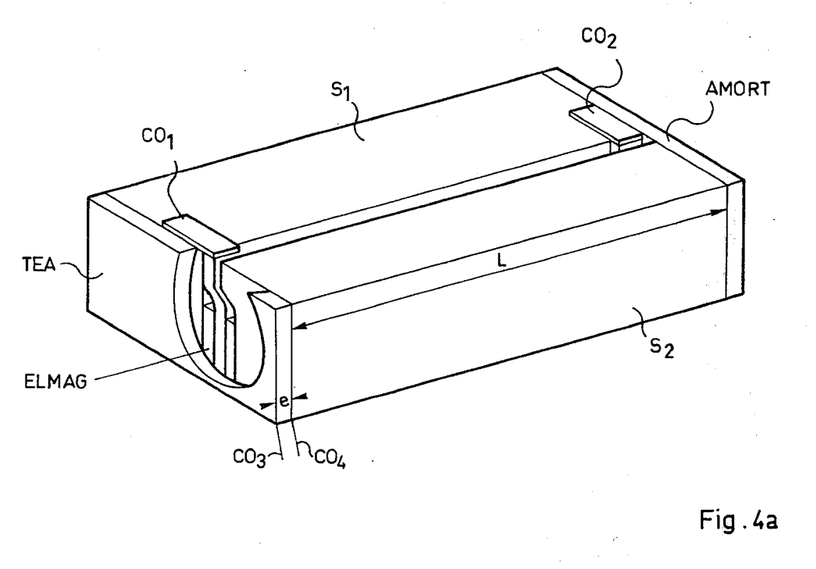
FIG. 4a being a pictorial view in perspective.
Figure 4B:
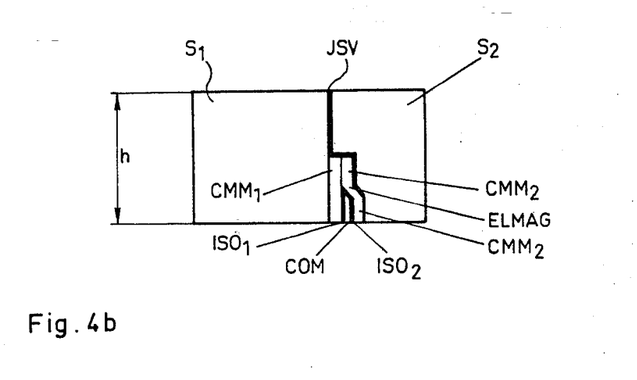
FIG. 4b being a view in cross-section.
Figure 5A:
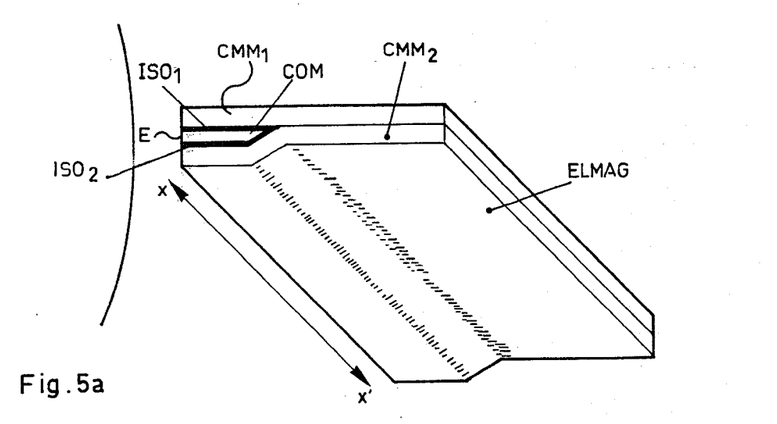
Figure 5B:
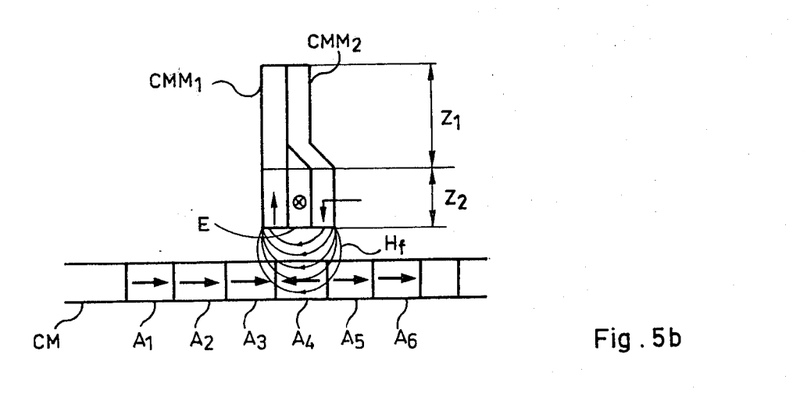
FIG. 5b being a view in cross-section.

The generating means ELMAG for generating the energizing field HE is illustrated in greater detail in FIGS. 4b, 5a and 5b comprises an electromagnet produced in accordance with the technique for production of integrated magnetic transducers described, for example, in French Pat. No. 2063093 and its corresponding U.S. Pat. No. 3,723,665. A multiple head magnetic device is shown in U.S. Pat. 3,846,841.

As shown in FIG. 5, the ELMAG electromagnet comprises a first thin magnetic layer $CMM_1$, a second thin magnetic layer $CMM_2$, coupled magnetically to the first, and a thin layer conductor COM situated between the two thin magnetic layers $CMM_1$ and $CMM_2$ and separated from the magnetic layers by a first insulating layer $ISO_1$ and by a second insulating layer $ISO_2$. The layers $CMM_1$ and $CMM_2$, and the conductor COM, form an air gap E.

It is apparent that the sole conductor COM may be replaced by a plurality of conductors in the form of thin layers separated from each other by insulating layers as shown, for example, in U.S. Pat. No. 4,189,524.

The thin magnetic layers $CMM_1$ and $CMM_2$ are formed, for example, by a magnetostrictive alloy of iron-nickel-cobalt. Depending on the magnitude of the percentage of iron or of nickel, this material has a magnetostriction of positive type, that is to say that a substantial variation of the magnetic state of the medium is obtained if the latter is exposed to a compression, or a magnetostriction of negative type, that is to say that a substantial variation of the magnetic state of the said medium is obtained if it is exposed to a traction.

When the conductor COM is traversed by a current I, the latter produces a magnetic field which magnetizes the two thin magnetic layers $CMM_1$ and $CMM_2$. It is then apparent that the set of two thin magnetic layers comprises two areas, namely, an area Z1 in which the magnetic material forming these two layers is saturated, an area Z2 in which the said material is unsaturated.

Only the area Z2 of the layers $CMM_1$ and $CMM_2$ will consequently be considered. The change in the magnetic state when area Z2 is exposed to a stress is illustrated in FIG. 2a. It will be assumed that all the paths $C_1, C_2 \ldots, C_j \ldots, C_n$ are present in this area. The magnetic leakage field $H_f$ established by the electromagnet ELMAG close to its air gap E and to the magnetic layer CM of the recording carrier SM, has magnetic field lines which have the contour shown in FIG. 5b.

It is apparent that the electromagnet ELMAG may be associated only with a magnetic recording layer of elementary magnets A1, A2, A3, A4, A5, A6, has been illustrated in this same Figure, in which the direction of magnetic induction is shown by an arrow. The magnetic induction in the magnet A4 is in the opposite direction to the magnetic induction in the magnets A1, A2, A3, A5, A6 for reasons which will be set forth below, in the description of the operation of the magnetic field generation device DGCM.

As can be seen from FIG. 4b, the electromagnet ELMAG is embedded in an assembly comprising two substrates S1 and S2, interconnected by a glass-solder joint JSV, the bond between S1 and S2 may be produced according to a known production process as described for example in French Pat. No. 2315139 filed on June 19, 1975, by Compagnie Internationale pour l' Informatique under the title: "New structure for integrated magnetic heads". The two substrates S1 and S2 are of identical nature and, for example, are produced from a material such as quartz or glass based on arsenic sulphide. The assembly of the two substrates S1 and S2 is welded in appropriate manner, as shown in FIG. 4a, to the electro-acoustic transducer TEA at one end, and at its other end to the dampting means AMORT, which are formed by a plastics material having a very high damping factor.

It is appropriate to observe that the material forming the substrates S1 and S2 should be such that the speed of propagation of the sound wave in this material is substantially identical to that of the same wave in the magnetic medium MAG. This propagation speed V is of the order of 4000 meters per second for quartz and of 100 meters per second for glass based on arsenic sulphide.

By way of example, the dimensions of the substrates S1 and S2 are the following. The height H is comparatively small and of the order of one millimeter whereas the length L is of the order of several centimeters.

The conductor COM of the electromagnetic MAG is connected to an input conductor $CO_1$ and to an output conductor $CO_2$, these two conductors being illustrated in FIG. 4a deposited on the upper part of the substrate S1.

Reference should now be made to FIG. 6, which illustrates a first method of propagation of the stress within the magnetic medium MAG.

Figure 6A:
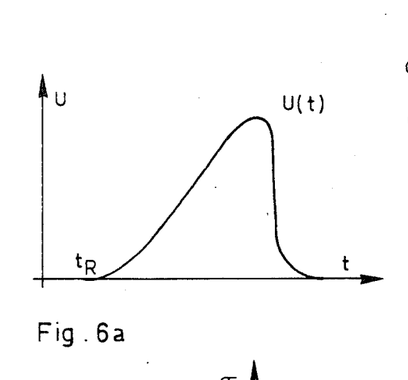
FIGS. 6a, 6b and 6c are a group of three graphs illustrating a first method of propagation of the strain within the magnetic circuit.
Figure 6B:
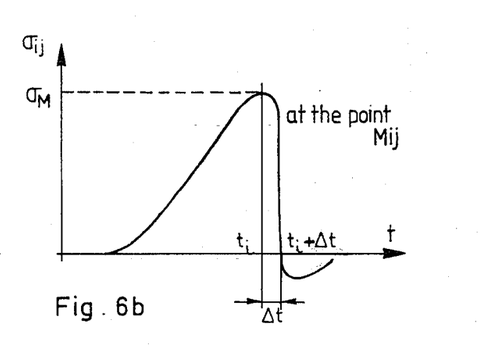
Figure 6C:
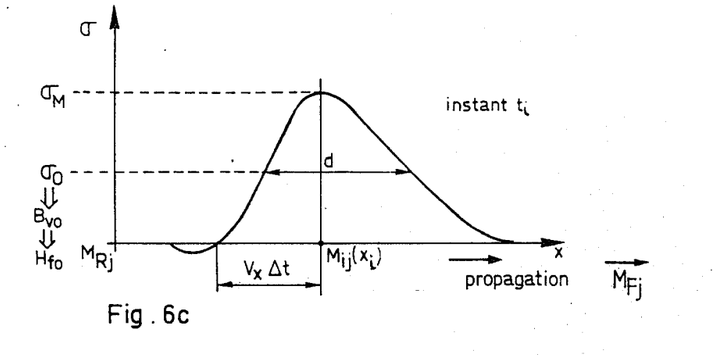

At the reference instant $t_R$, a current pulse U(t) (illustrated in FIG. 6a) from pulse generator $MC_1$ is fed to the electro-acoustic transducer TEA via the conductors $CO_3$ and $CO_4$. The transducer TEA then produces a sound wave which generates a stress which is propagated in the magnetic medium MAG, as well as in the substrates S1 and S2, with a speed V. Consider now the surface $S_i$ (FIG. 6a) formed by the set of points $M_{ij}$ of the paths $C_1, \ldots, C_j \ldots, C_n$, situated at a distance $x_i$ from the reference surface $S_R$. The surface $S_i$ comprises two semisurfaces $S^1_i$ and $S^2_i$ belonging respectively to the layers $CMM_1$ and $CMM_2$. The reasoning which follows is valid throghout the surface $S_i$ given that the magnetic field in the surface $S^1_i$ is equal in absolute value and opposed in direction to the field in the surface $S^2_i$ (see FIG. 5a). At an optional point $M_{ij}$ of an optional path $C_j$ of the surface $S_i$, the stress $\sigma_{ij}$ varies as a function of time as shown in FIG. 6b, the stress reaching its maximum value $\sigma_M$ at the instant $t_j$. The distribution of the stress as a function of the abscissa x measured along the path $C_j$ from the reference point $M_{rj}$ is that shown by FIG. 6c.

Figure 6D:
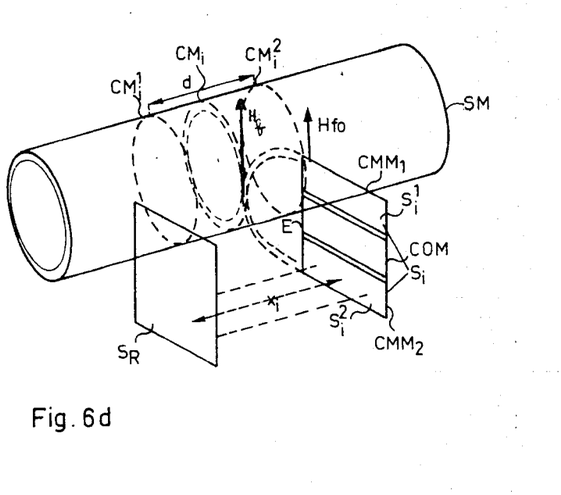
FIG. 6d illustrating the method of propagation of stress within the magnetic medium.

For a given value of the intensity of the energizing field HE, there is a value of the stress $\sigma_0$ creating a selection field $HS_0$ at any point of the surface $S_i$, which being superimposed on the field HE renders it possible to obtain an induction field $B_{\nu O}$ (refer to FIG. 2a), such that the corresponding leakage field $H_{fO}$ which is produced by the electromagnet ELMAG in the plane of this surface and is applied to the magnetic carrier SM, renders it possible to saturate the section $CM_i$ of the magnetic layer CM situated in this plane (see FIG. 6d). As a matter of fact, it can be demonstrated that the leakage field $H_f$ created by the electromagnet ELMAG is proportional to the induction field $B_\nu$ with in the area $Z_2$ of the magnetic medium MAG. The leakage field $H_f$ attributable to the induction $B_\nu$ is equal to $H_{f\sigma} + H_{fI}$ in which $H_{f\sigma}$ is the leakage field corresponding to the selection field HS generated by the stress and $H_{fI}$ is the leakage field corresponding to the energizing field HE generated by the current I flowing in the conductor COM. It is clearly apparent from FIG. 6c, that a portion of the path $C_j$ of a width d in which the stress exceeds $\sigma_O$ is present around a point $M_{ij}$, that is to say in which the magnetic induction field $B_\nu$ is greater than $B_{\nu O}$ and wherein the leakage field produced by the transducer ELMAG is consequently greater than $H_{\nu O}$, renders it possible to saturate the carrier SM along a length close to d between the sections $CM^1_i CM^2_i$ (see FIG. 6d). As a rule, the distance d is very appreciably greater than the length of the elementary magnets which it is customarily sought to obtain in the sphere of magnetic recording. For an identical surface $S_i$, the stress has a uniform value $\sigma$, all the values $\sigma_{ij}$ being equal.

So that elementary magnets of a size substantially smaller than d may be recorded on the carrier, the energizing field HE and the selection field HS which are produced by the stress $\sigma$ are superimposed only during the dropping portion of the stress, that is to say between the instants $t_j$ and $t_j + \Delta t$ (see FIG. 6b). The data are then recorded on the recording carrier SM in the manner shown in FIGS. 7 and 8.

Figure 7:
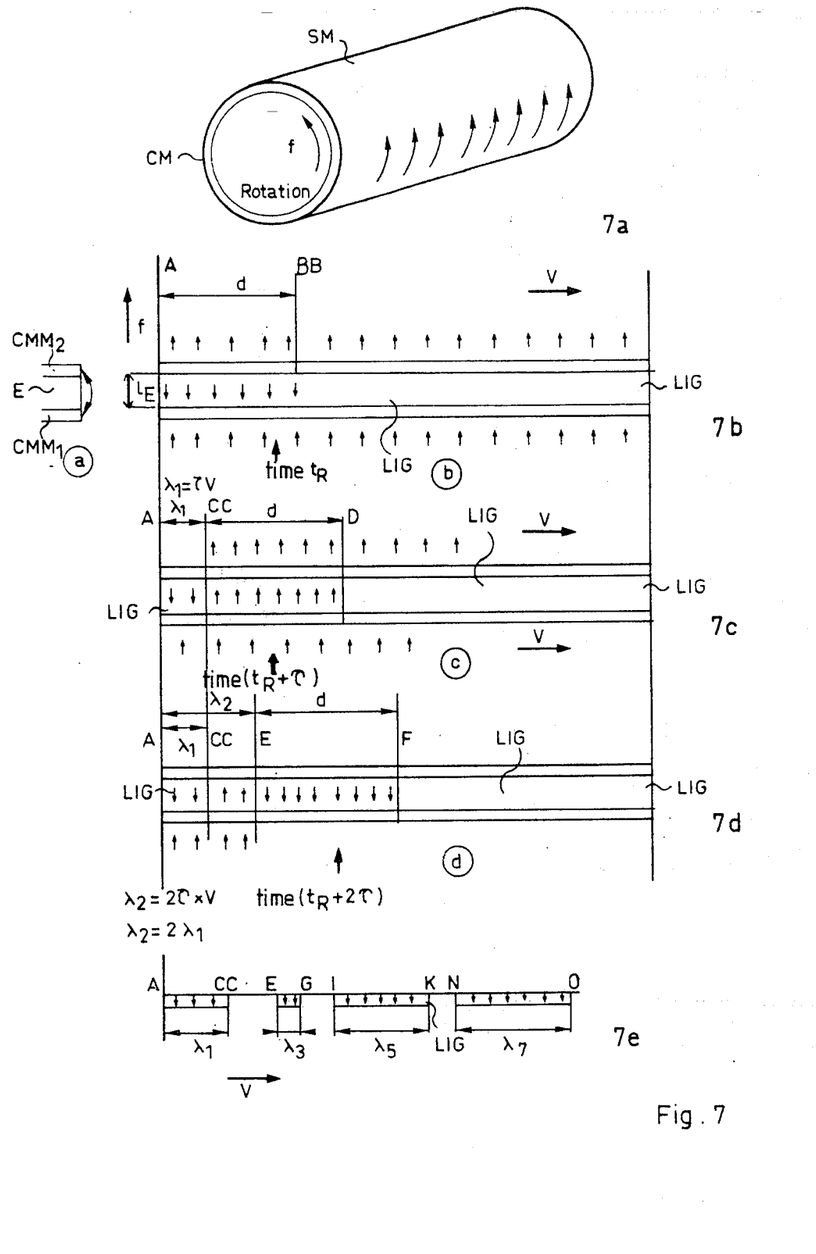
FIGS. 7 and 8 show the manner in which data is recorded on the magnetic recording carrier, FIG. 8 showing the major hysteresis cycle of the magnetic material forming the recording layer of the said carrier.

FIG. 7 shows the drum SM turning in the direction of the arrow f. It is assumed that the magnetic layer CM is saturated beforehand in the direction shown in this same Figure, the magnetic induction then being assumed to be equal to $-B_{rsm}$.

FIG. 6b showns the part of the magnetic drum SM situated opposite the thin magnetic layers $CMM_1$ and $CMM_2$ and the air gap E of the electromagnet ELMAG. To simplify matters, it will be assumed that during the recording of this whole portion of the carrier, that is to say during the recording of a line LIG of the drum, the line remains unmoving. The recording line LIG is then recorded in the following manner described with reference to FIGS. 7b, 7c and 7d.

(a) First operation: at the instant $t_R$, a voltage front U(t) is applied to the electro-acoustic transducer TEA on the one hand, and a current $+I_1$ is applied at the same time to the conductor COM of the electromagnetic ELMAG. The carrier SM is exposed to a leakage field $H_f$ (at least equal to $H_{fO}$) generated by the electromagnet throughout the length of the segment AB of the line LIG, or say along a length equal to d (see equally FIG. 6c). The magnetic state of all the points of this segment consequently changes from the state defined by the point P at which the induction is equal to $-B_{rsm}$ to the magnetic state defined by the point Q at which the magnetic induction is equal to $+B_{rsm}$ (see FIG. 8). The direction of induction has been illustrated by a plurality of arrows in FIG. 7.

(b) Second operation: at the instant $t_R + \tau$, the current in the conductor COM is reversed, this current then being equal to $-I_1$. The stress $\sigma$ has been displaced within the area $Z_2$ from the left towards the right by a distance $\lambda_1$ equal to $\tau \times v$. The result thereof is that the totality of the points of the segment AC having the length $\lambda_1$ (see FIG. 7c) is no longer exposed to the leakage field $H_{f\sigma}$ caused by the stress. It is thereupon exposed only to the leakage field $-H_{fI1}$ caused by the current $-I_1$ circulating in the conductor COM, the magnetic state of each of its points changing from that defined by the point Q of the cycle illustrated in FIG. 8 to the state defined by the point R'. The totality of the points of the segment CD having the length d is exposed to the field $-H_{fO}$ resulting from the superimposition of the leakage field $-H_{fI1}$ and $-H_{f\sigma}$ generated by the stress. The magnetic state of each of its points is then defined by the points S of the hysteresis cycle of FIG. 8.

(c) Third operation: at the instant $t_R + 2\tau$, a current $+I_1$ is again fed to the conductor COM. As compared to the instant $t_R$, the stress has been shifted by a distance $\lambda_2 = 2\lambda_1$ equal to $2\tau \times v$.

Figure 8:
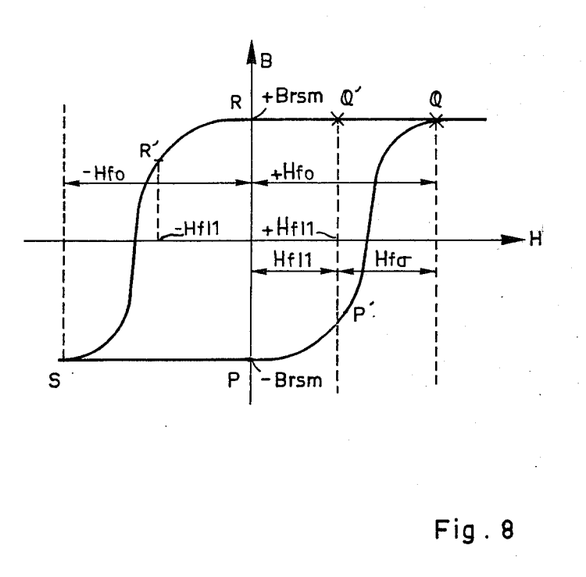

The whole of the points of the segment CE of the line LIG is thereupon exposed only to the leakage field $+H_{fI1}$ and its magnetic state which is defined by the point p' of the cycle of FIG. 8 is close to the initial magnetic state of all the points of the magnetic layer CM of the carrier SM. (Point P of the cycle). The whole of the points of the segment EF having the length d is thereupon exposed to the leakage field $+H_{fO}$ resulting from the sum of the leakage field $H_{fI1}$ and $H_{f\sigma}$ caused by the stress. The magnetic state of its points is then defined by the point Q of the cycle.

The conductor COM is again supplied with a current $-I_1$. The recording operation which is then performed is identical to that described under the heading b) second operation. The continuation of the series of operations of recording the whole of the line LIG of the carrier SM is identical to that which has been described in the sections described in (a), (b).

It should be clearly apparent that it is possible to record magnetic segments of the nature of the segment AC of a width substantially equal to the width $1_E$ of the air gap and whose length depends on the period of traversal of the current $+I_1$ in the conductor COM, which makes it possible to engender on the carrier SM a magnetic induction field opposite in direction to the induction field defining the initial state of the whole of the carrier SM. FIG. 7e shows a line LIG thus recorded, comprising a series of segments AC, EG, IK, NO, of different lengths $\lambda_1$, $\lambda_3$, $\lambda_5$, $\lambda_7$.

Figure 9A:
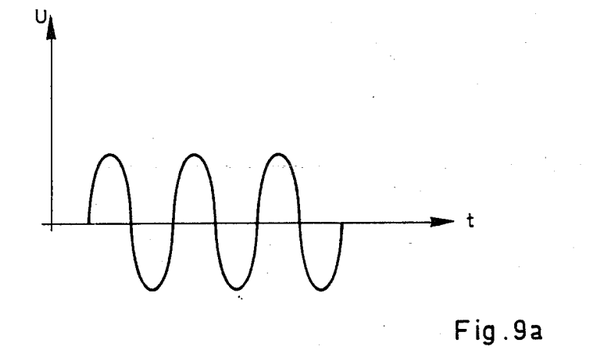
FIGS. 9a, 9b and 9c are a set of graphs showing a second method of propagation of the stress in the magnetic circuit of the magnetic induction field generation device.
Figure 9B:
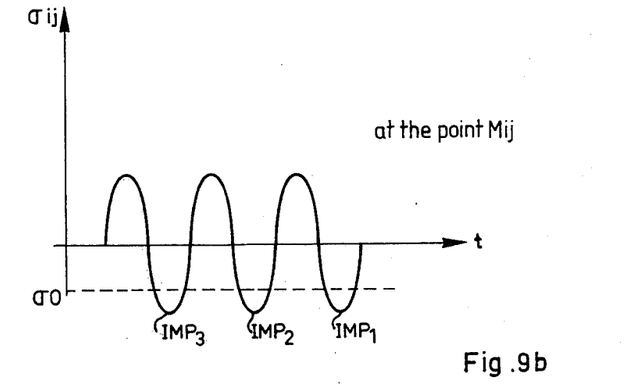
Figure 9C:
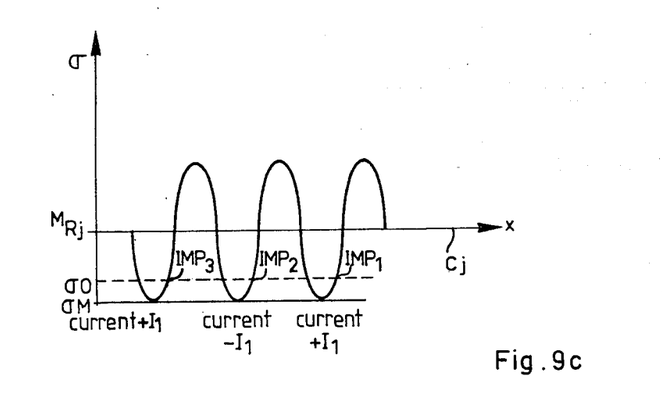

FIG. 9 illustrates a second method of propagation of the stress within the magnetic medium MAG.

The electro-acoustic transducer TEA is supplied with a train of voltage pulses illustrated in FIG. 9a, of substantially sinusoidal shape. The transducer TEA then generates a train of sound waves producing a series of stresses whose representative graph, as a function of time at a given point $M_{ij}$ of a path $C_j$ appertaining to the surface $S_i$ of the area $Z_2$ is illustrated in FIG. 9b. At the instant $t_j$ in which the series of stresses reaches the point $M_{ij}$, the distribution of the stresses as a function of the abscissa x measurement along the path $C_j$ is given by the graph illustrated in FIG. 9c. It is assumed that the leakage field generated by the electromagnet ELMAG has an intensity sufficient to saturate the recording layer of the carrier SM for a negative stress having an absolute value greater than $\sigma_O$ (see FIG. 8c). Each point $M_{ij}$ of the surface $S_i$ will consequently be exposed to a series of three negative stress pulses, being: $IMP_1$, $IMP_2$ and $IMP_3$.

When the point $M_{ij}$ is exposed to the stress pulse $IMP_1$, a current $+I_1$ is applied to the conductor COM, and then when the point $M_{ij}$ is exposed to the stress pulse $IMP_2$, the conductor COM is supplid with a current $-I_1$, and finally, when this same point is exposed to the stres pulse $IMP_3$, the conductor COM is supplied with a current $+I_1$. The change in the magnetic state of a point of the circle $CM_i$ of the carrier SM situated opposite the point $M_{ij}$ of the medium MAG is defined by the hysteresis cycle of FIG. 8. It is then apparent that the final magnetic state of this point of the carrier is identical to that which it would have if the point $M_{ij}$ has exposed only to the stress pulse $IMP_3$, the conductor COM being supplied with the current $-I_1$. It is consequently apparent that only the passage of the final stress pulse is of importance for defining the final magnetic state of an optional point of the carrier SM. It is evident that in this case, the data recording method illustrated by FIGS. 7 and 8 is reverted to. It is assumed that the frequency of the soundwave train transmitted by the transducer TEA is of the order of 20 Megahertz. In this case, the change of the final pulse $IMP_3$ from its maximum value $\sigma_M$ to a zero value will occur during a period equal to $1.25 \ 10^{-8}$ seconds (the quarter of the cycle).

Figure 10A:
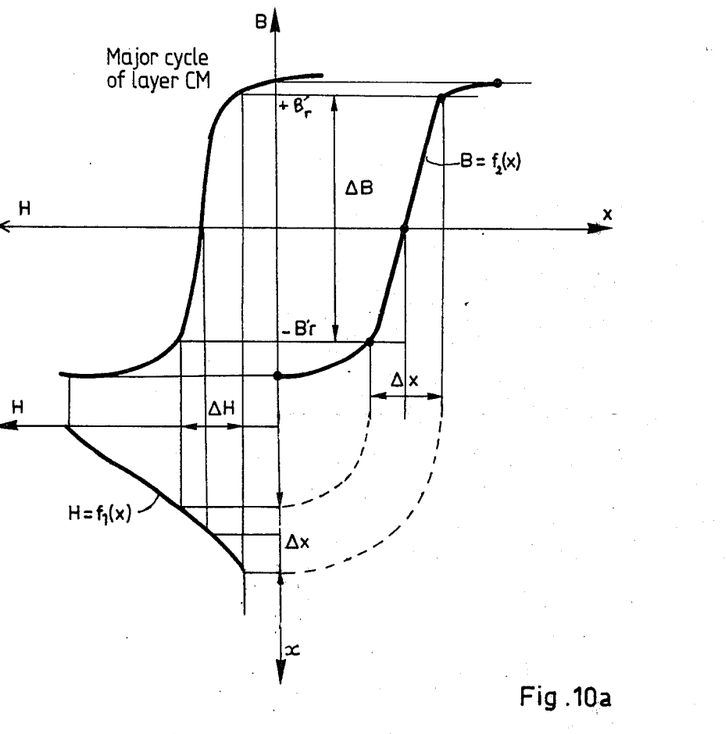
FIGS. 10a and 10b illustrate how the width of the elementary magnetic areas recorded on the magnetic recording carrier and the minimum distance separating these different areas may be determined from the major hysteresis cycle of the carrier.
Figure 10B:
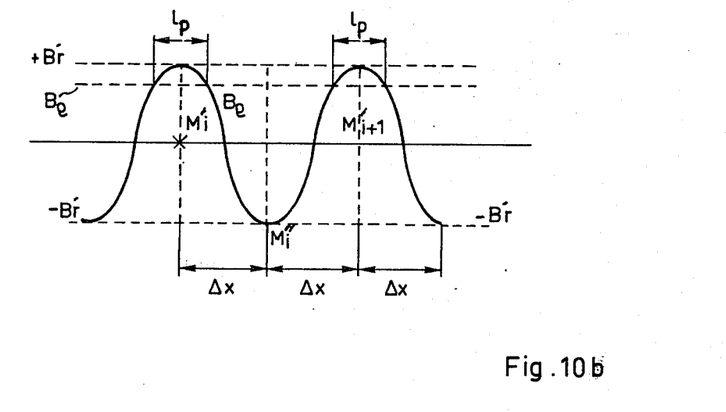

Referring to FIGS. 10a and 10b, for a given point $M'_i$ of a recording line LIG of the carrier SM, FIG. 10a shows the three graphs $B = f(H)$, $H = f_1(x)$ and $B = f_2(x)$, x being measured along the direction of the line LIG. The point $M'_i$ is assumed to be situated opposite a surface $S_i$ in which the stress is equal to $\sigma_M$ (see also FIGS. 6b, 6c and 9c). The induction at this point is assumed to be equal to $+B'_r$. FIG. 10b shows the distribution of the induction along a line LIG at either side of the two points $M'_i$ and $M'_{i+1}$ ($M'_{i+1}$ is equal to $+B'r$. At a given speed of propagation, the induction changes from a value $+B'_r$ to a value $-B'_r$ (point $M''_i$, FIG. 10b) over a so-called "transition" section of a length $\Delta x$ between two areas of opposite magnetizations, (see also FIG. 10a). The variation of induction $\Delta B$ along the section having the length $\Delta x$ is consequently equal to $2B'_r$. A variation H corresponds to this variation $\Delta B$ (see the graph $H = f_1(x)$).

The distance between the points $M'_i$ and $M'_{i+1}$ equal to 2 x, is referred to as "pitch" between the points $M'_i$ and $M''_i$.

So that the magnetic data contained within an optional area $D_i$ may be exploited, for example by data readout devices as utilized in current practice, the magnetic induction within this area should be greater than a particular value $B_1$. An area having a width $l_p$ (FIG. 10b) in which the induction exceeds $B_1$, is present at either side of the point $M'_i$ (and equally of $M'_{i+1}$). The dimension $l_p$ is referred to as "point width", the corresponding area being referred to by extension as "recording point". With a propagation speed V of 4000 meters per second, it is possible at a maximum to record points at a pitch of 120 microns, with a point width of 60 microns. With a speed of 1000 meters per second, the pitch of the points would amount to at most 30 microns, with points having a width of 15 microns. The frequency of the current fed to the conductor COM would be 33 Megahertz for the points having the pitch of 120 microns, with v = 4000 m/sec. As a matter of fact, if the pitch $l_p$ is 120 microns with a propagation speed of 4000 m/s = $4 \times 410^9$ u/s, the frequency f of the current is = $4 \times 410/120^9 = 33$ MHz. It is apparent that:

(a) The resonance frequency of the electroacoustic transducer TEA determines the transitional spacing between two adjacent elementary magnets having magnetic inductions opposite in direction, as a function of the speed V of propagation of the stress, and of the form of the major hysteresis cycle of the magnetic material forming the recording layer;

(b) for a given frequency of the current supplied to the conductor COM, the speed of propagation determines the optimum resolution of the system (that is to say the pitch between the points);

(c) conversely, at a given speed of propagation, the frequency of the current fed to the conductor COM determines the optimum resolution; and (d) That the frequency of the current fed to the conductor COM is limited by the inductance of the electromagnet ELMAG and consequently by the length L of the same (since this inductance is proportional to the length L).

Figure 11:
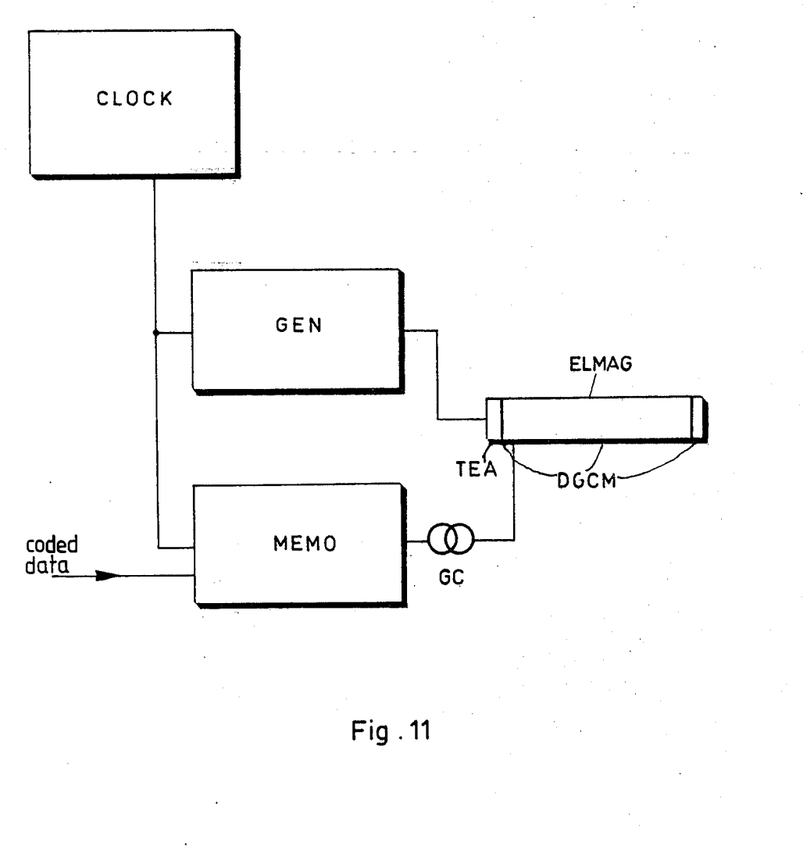
FIG. 11 is a block diagram of an embodiment of the electronic circuits for control of the magnetic field generation device according to the invention.

Referring to FIG. 11, the means $MC_1$ and $MC_2$ for controlling the transducer TEA and the electromagnet ELMAG, comprise:

a timer CLOCK,
a voltage generator GEN,
a memory MEMO and
a current generator GC.

Let it be assumed that it is wished to record a plurality of recording lines $LIG_1$, $LIG_2$, $LIG_k$, ..., $LIG_n$, on the carrier SM. The voltage generator GEN can deliver either a pulse of the order of 50 to 150 volts, the period of passage of the same from its maximum value to its zero value being of the order of a few nanoseconds, or a train of pulses at the resonance frequency of the transducer TEA, say approximately 20 Megahertz.

The memory MEMO stores coded data delivered by a device which is not shown in FIG. 11, at a relatively low frequency.

The capacity of this memory is a function of the number of elementary magnetic areas that it is wished to record on a line $LIG_k$, which is of the order of 2 to 4000. This memory MEMO is capable of playing back the data stored at the frequencies specified above, say 33 Megahertz. It is triggered by the timer CLOCK which also actuates the generator GEN at the recording frequency of the plurality of recording lines $LIG_1$ to $LIG_n$ (that is to say the number of recording lines per second).

I claim:

1. A process for generating a magnetic induction field within a magnetic medium having a magnetically unsaturated portion comprising producing within the unsaturated portion a magnetic energizing field, generating a selection wave and propagating said wave along at least one given path of said medium, starting from a given datum point and from a reference instant $t_R$, and reaching each point of the said path at an instant the selection wave and the energizing field acting simultaneously at the instant $t_i$ on an area surrounding each point of the said path cause the magnetic properties of said area to be modified and the said induction field to be generated.

2. A process according to claim 1, wherein the magnetic medium is of the magnetostrictive type, and the selection wave creates in the said area, at the instant $t_i$, a mechanical stress which for its part produces a magnetic selection field.

3. A process according to claims 1 or 2, wherein the selection wave is a sound wave.

4. A process according to claim 1, wherein the step of modifying the magnetic properties results in an improvement in the magnetic properties of said area of the magnetic medium.

5. A process according to claim 4, wherein the improvement is in the form of an enlargement of the hysteresis cycle for said area and an increase in its magnetic permeability.

6. A magnetic transducer for generating a magnetic induction field within a magnetic medium having a magnetically unsaturated portion comprising means connected to a datum point on the medium for generating a selection wave to be propagated along at least one given path of said medium, starting from said given datum point and from a reference instant $t_R$ and reaching each point along the said path at an instant the selection wave and an energizing field acting simultaneously at the instant $t_i$ on an area surrounding each point of the said path cause the magnetic properties of said area to be modified and means for generating said magnetic energizing field at least partially along said path such that the selection wave and the energizing field act simultaneously at the instant $t_i$ on the said area so as to cause the said induction field to be generated within the magnetic medium.

7. A transducer according to claim 4, wherein the magnetic medium is of the magnetostrictive type, and the selection wave creates in the said area, at the instant $t_i$, a mechanical stress which for its part produces the magnetic selection field.

8. A transducer according to claims 4 or 5, wherein the means for generating the selection wave is an acoustical generator.

9. A transducer according to claims 4 or 5, wherein said selection wave is a sound wave.

10. A system for generating a magnetic induction field within a magnetic medium having a magnetically unsaturated portion comprising means connected to a datum point in the medium for generating a selection wave to be propagated along at least one given path of said medium, starting from said given datum point and from a reference instant $t_R$, and reaching each point along the said path at an instant the selection wave and an energizing field acting simultaneously at the instant $t_i$ on an area surrounding each point of the said path cause the magnetic properties of said area to be modified, and means for generating said magnetic energizing field at least partially along said path such that the selection wave and the energizing field act simultaneously at the instant $t_i$ on the said area so as to cause the said induction field to be generated within the magnetic medium, means for controlling the means of generating the selection wave means for controlling the means of generating the energizing field, and a recording carrier situated closely adjacent to and in front of the said medium in such manner that the recording is made along a direction parallel to the said path.

11. A system for generating a magnetic field according to claim 10, wherein the means for generating the selection wave comprises an acoustical transducer for generating an acoustic wave.

12. A system for generating a magnetic field according to claim 10, wherein the means for generating the energizing field comprises an electromagnet of integrated type comprising two thin magnetically coupled magnetic layers, and at least one conductor separated from each of the magnetic layers by at least one electrically insulating layer.

13. A system for generating a magnetic field according to claim 10, wherein the magnetic medium is of the magnetorestrictive type, the selection wave creating in the said area, at the instant $t_i$, a mechanical stress which for its part produces a magnetic selection field.

14. A system according to claim 13, wherein said selection wave is a sound wave.

* * * * *

UNITED STATES PATENT AND TRADEMARK OFFICE
CERTIFICATE OF CORRECTION

PATENT NO. : 4,323,940
DATED : April 6, 1982
INVENTOR(S) : Jean-Pierre Lazzari

It is certified that error appears in the above-identified patent and that said Letters Patent are hereby corrected as shown below:

Claim 7, line 1, cancel "4" and substitute --6--.

Claim 8, line 1, cancel "4 or 5" and substitute --6 or 7--.

Claim 9, line 1, cancel "4 or 5" and substitute --6 or 7--.

Signed and Sealed this

Tenth Day of August 1982

[SEAL]

Attest:

Attesting Officer

GERALD J. MOSSINGHOFF

Commissioner of Patents and Trademarks